No. 734,391. Patented July 21, 1903.

UNITED STATES PATENT OFFICE.

WILLIAM J. ARMBRUSTER, OF ST. LOUIS, MISSOURI.

PROCESS OF MAKING PIGMENTS.

SPECIFICATION forming part of Letters Patent No. 734,391, dated July 21, 1903.

Application filed August 25, 1902. Serial No. 120,996. (No specimens.)

*To all whom it may concern:*

Be it known that I, WILLIAM J. ARMBRUSTER, a citizen of the United States, residing at St. Louis, State of Missouri, have invented certain new and useful Improvements in Processes of Making Pigments, of which the following is a specification.

My invention has relation to improvements in processes of making pigments; and it consists in the novel series of steps more fully set forth in the specification and pointed out in the claims.

The present invention contemplates the precipitation of zinc hydrate from solutions of zinc salts and a hydrate of an alkali metal and the precipitation of barium carbonate from solutions of a barium salt and a carbonate of an alkali metal, recovering the precipitates, washing the same, then thoroughly mixing the same, drying, and finally, if desirable, calcining the zinc hydrate into zinc oxid.

While no claim is made herein to the product, the process of producing the same in the manner stated is believed to be new.

As an illustration of the general principle here enunciated, I prepare one molecular equivalent of an aqueous solution of zinc chlorid, one equivalent of barium chlorid, two equivalents of sodium hydrate, and one equivalent of sodium carbonate and mix them, when there will result a precipitate of one equivalent of zinc hydrate, one equivalent of a precipitate of barium carbonate, and four equivalents of a solution of sodium chlorid. In lieu of the chlorids of zinc and barium I can of course substitute the acetates or nitrates of these bases, in which event the resulting solutions will be respectively the acetate or nitrate of sodium, as is obvious.

The foregoing can be expressed by the following reaction:

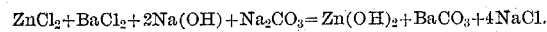

While the foregoing reaction conforms to the conditions as expressed in the statement as to what constitutes the present invention, in practice I employ cheaper salts of zinc and barium than the chlorids of these bases, at the same time producing as by-products solutions available for commercial purposes, whereas the sodium chlorid in the foregoing reaction is comparatively valueless, and while a valuable by-product in the shape of an acetate or nitrate of sodium could be produced by the substitution of the acetates or nitrates of the zinc and barium bases (for the chlorids thereof) still there is an objection to the use of the latter on account of the high price of these salts, so that in practice my process is best carried out in the following manner: I take one molecular equivalent of an aqueous solution of zinc sulfate, to which I add two molecular equivalents of a solution of sodium hydrate, when there is precipitated one molecular equivalent of zinc hydrate, leaving a solution of one equivalent of sodium sulfate. I then take a solution of one equivalent of barium sulfid, to which I add one equivalent of a solution of sodium carbonate, when there is precipitated one equivalent of barium carbonate, leaving one equivalent of a solution of sodium sulfid. The respective precipitates are washed, mixed, and dried, and finally, if desirable, can be calcined sufficiently to convert the zinc hydrate to zinc oxid. This calcination of the zinc hydrate can of course be effected before its mixture with the barium carbonate.

The sodium sulfate will find ready use in a pigment factory in the production of blanc fixe, (precipitated barium sulfate.) The sodium sulfid can be used in the production of zinc sulfid or evaporated to a crystalline condition, in which form it finds a ready sale. Both the sodium sulfate and sodium sulfid, however, can be put to many other uses.

The foregoing can be expressed by the following reactions:

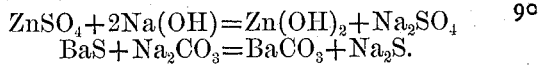

In the first of the latter reactions attention may be called to the fact that zinc hydrate is soluble in an excess of sodium hydrate, and as there is always danger of some of the precipitate dissolving it becomes desirable that such dissolved precipitate shall be eliminated from the final solution, since its presence might result in the production of zinc sulfid by reaction with barium sulfid used in the conversion of the said solution into blanc fixe, as above stated. This dissolved zinc hydrate can be removed from the solution of sodium sulfate by a careful addition of sodium sulfid, when the zinc will be precipitated as sulfid and can be removed from the remaining solution, thus:

$$Na_2SO_4+Zn(OH)_2+Na_2S=Na_2SO_4+ZnS+2Na(OH).$$

The presence of the small amount of sodium hydrate in the sodium-sulfate solution will in no wise interfere with the precipitation of the blanc fixe upon the addition of the barium sulfid generally employed in the process.

It is of course apparent that I may invoke the doctrine of equivalents where the same may be applicable. For example, I may substitute potassium or ammonium for the sodium base wherever it occurs, producing, of course, corresponding differences in the final solutions. This is apparent to any one skilled in the art.

Having described my invention, what I claim is—

1. The process of making pigment which consists in mixing solutions of zinc and barium salts, with the hydrates and carbonates of an alkali metal, and recovering the resulting precipitates, substantially as set forth.

2. The process of making pigment which consists in mixing solutions of zinc chlorid and barium chlorid, sodium hydrate and sodium carbonate, and recovering the resulting precipitates, substantially as set forth.

3. The process of making pigment which consists in mixing solutions of zinc chlorid and barium chlorid, and the hydrate and carbonate of an alkali metal, and recovering the resulting precipitates, substantially as set forth.

In testimony whereof I affix my signature in presence of two witnesses.

WILLIAM J. ARMBRUSTER.

Witnesses:
EMIL STAREK,
G. L. BELFRY.